Aug. 9, 1966  L. G. GILBERT ETAL  3,265,428
LOGGING TRACTOR BUMPER

Filed May 18, 1964  2 Sheets-Sheet 1

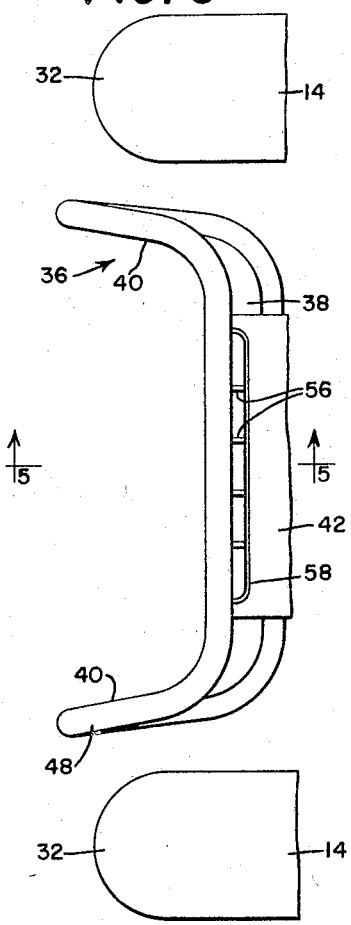
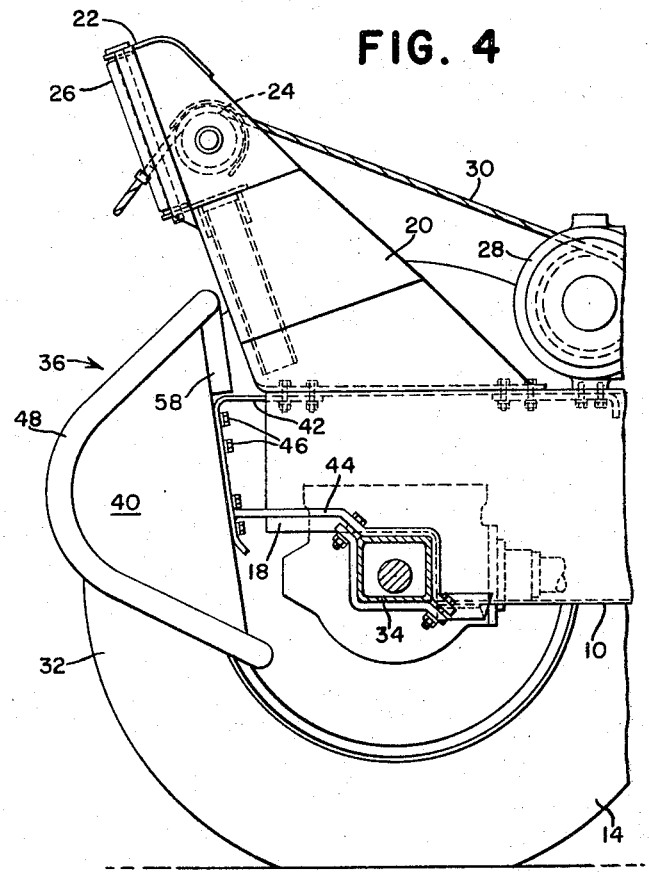
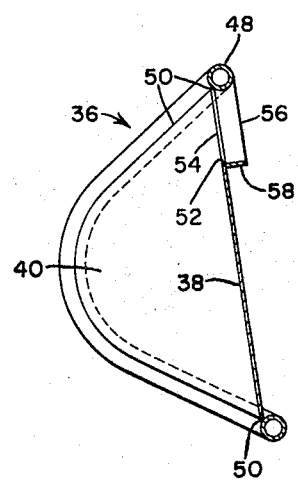

United States Patent Office 3,265,428
Patented August 9, 1966

3,265,428
LOGGING TRACTOR BUMPER
Leland G. Gilbert, Dubuque, John G. Johnson, Waterloo, and Waldean W. Grauerholz, Cedar Falls, Iowa, assignors to Deere & Company, Moline, Ill., a corporation of Delaware
Filed May 18, 1964, Ser. No. 367,984
3 Claims. (Cl. 293—1)

This invention relates to logging equipment and more particularly to what is known as a log bumper for facilitating the handling of a plurality of logs when drawn toward a winching vehicle by a cable or the like.

It is conventional practice to equip a vehicle, one way or another, with a winch and fairlead and to pay out the winch cable to reach a plurality of logs lying among the timber. Several shorter cables are attached to the main cable so that the plurality of logs may be winched up to the vehicle. The prior art reveals that some sort of protective measures must be taken to guard the vehicle against damage by the butt-ends of the logs as they are winched up against the rear of the vehicle, and in some cases the vehicle is equipped with a plate or similar structure for this purpose.

According to the present invention, an improved bumper of the general character has been provided, with such improvements as the addition of wings at opposite sides of a transverse plate portion, the provision about the periphery of the structure of bordering means of rounded section to prevent fraying of the cable when lines of force are at angles to the vehicle, an opening in the transverse portion whereby the operator of the vehicle may more readily see the approaching logs, and a novel relationship between the log bumper wings, the vehicle wheels and the fairlead.

The foregoing and other important objects and desirable features inherent in and encompassed by the invention will become apparent as a preferred embodiment thereof is disclosed, by way of example, in the ensuing description and accompanying sheets of drawings, the figures of which are described below.

FIG. 3 is a fragmentary plan view, with portions broken away, as seen generally along the line 3—3 of FIG. 2.

FIG. 4 is a fragmentary elevation, partly in section, as seen along the line 4—4 of FIG. 2.

FIG. 5 is a section of the bumper per se as seen along the line 5—5 of FIG. 3.

Figure 1:
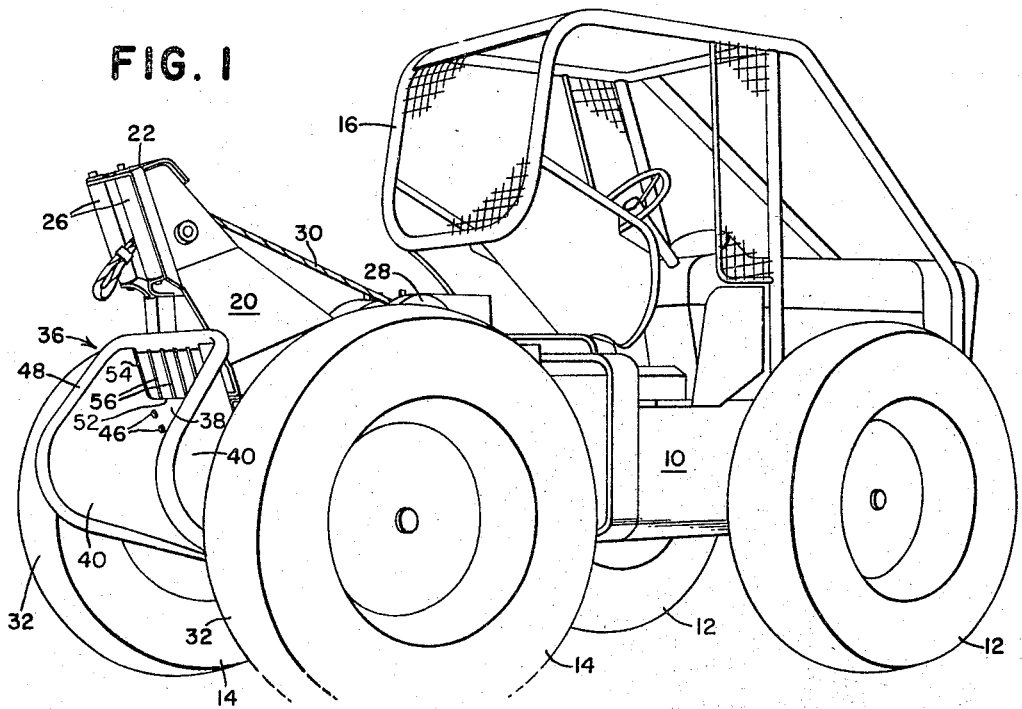
FIG. 1 is a perspective of a logging vehicle equipped with the improved log bumper.
Figure 2:
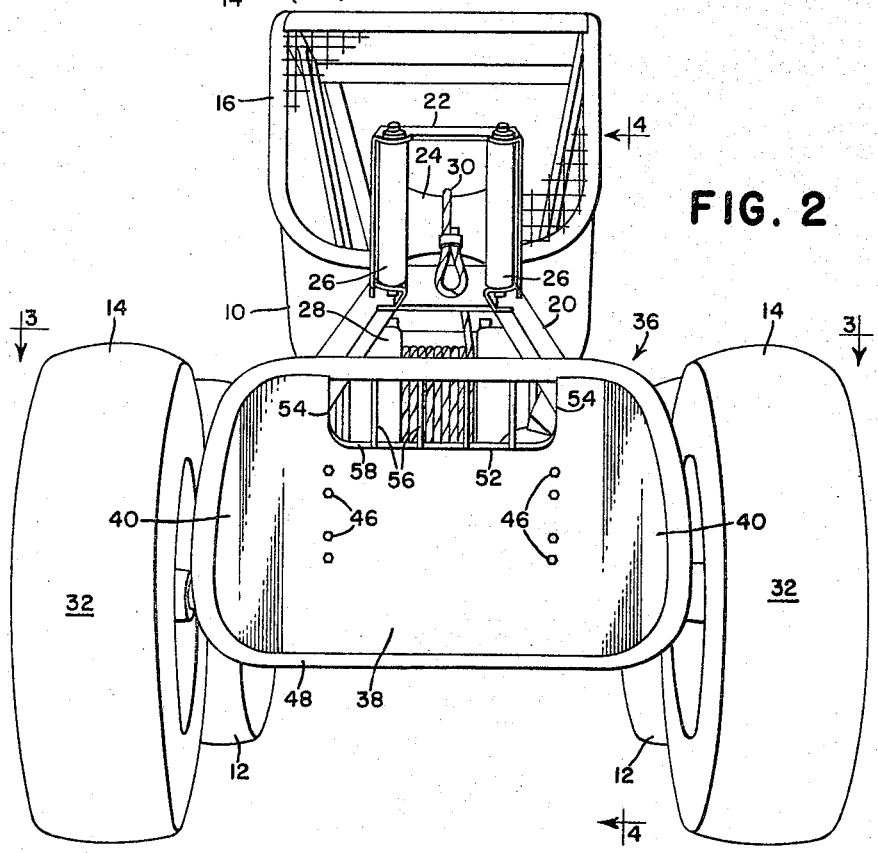
FIG. 2 is a perspective rear view of the same.

The vehicle illustrated for purposes of describing the invention is of the articulated or center-hinged type of tractor 10, carried on front and rear wheels 12 and 14 and including a protected operator's station 16.

The tractor 10 has a fore-and-aft body portion including a rear end 18 on which is mounted in any suitable fashion a support 20 which extends upwardly and rearwardly to provide a fairlead 22, typically including a main horizontal roller 24 and a pair of generally upright rollers 26. The body portion 18 further carries a typical winch 28 from which a cable 30 extends upwardly and rearwardly through the fairlead.

As will be clear from the drawings, the diameter of each of the rear wheels 14 is such that a rear peripheral portion thereof is rearwardly of the rear body part 18. For purposes of clarity, these peripheral portions are designated by the numeral 32. See especially FIG. 3. The body part 18 is relatively narrow compared to the transverse spacing between the wheels 14 and is supported on laterally oppositely outwardly extending axle housings, one of which appears in FIG. 4 at 34. It is clear that the tractor is symmetrical at opposite sides of its fore-and-aft center line.

It is within the U-shaped space thus afforded between the peripheral portions 32 of the wheels and the rear body part 18 that the novel log bumper, designated in its entirety by the numeral 36, is mounted.

This bumper is of U-shape as seen in plan, having a relatively wide generally upright plate-like intermediate or central part 38 and a pair of plate-like wings 40. The bumper is mounted by its intermediate part 38 on the rear end 18 of the tractor by any appropriate supporting means, here a transverse plate 42 and side plates 44 and a plurality of bolts 46, so that, as previously indicated, the central part 38 is essentially upright, although it slopes somewhat upwardly and rearwardly. It is to be further noted that the transverse expense of the part 38 is slightly less than the spacing between the inner or inboard faces of the wheel portions 32, and that the wings 40, in their rearward extents, lie closely alongside the respective inboard faces of the wheels. Also, the space that is embraced, so to speak, by the bumper is centrally below the upper part or fairlead 22 of the support 20. The wings 40 further diverge slightly away from the plane of the central part or surface 38. Consequently logs that are dragged in toward the vehicle from angles are influenced by the central pull of the cable as it is reeled in over the fairlead. Logs coming in at extreme angles are engaged by one or the other of the wings so as to prevent the logs from butting against the tires of the vehicle. This is also particularly true when the vehicle is being maneuvered at angles to the line of pull on the logs. The bumper is of sturdy construction so as to withstand impacts as the logs butt against it.

Since auxiliary cables connected to the main cable, or even the main cable itself, may be utilized at relatively extreme angles, it is found that the cable may become worn or frayed as it rasps across the edge of the bumper. Accordingly, the present invention provides on the bumper a bordering element for minimizing damage to the cable. In this case, this element comprises a peripheral tubular element 48 which extends along the top edge of the central part 38, following the top and bottom edges of each wing 40 and extends across the lower edge of the part 38. As best seen in FIGS. 1 and 5, the top and bottom edges of each wing 40 converge toward the rear and meet at a rounded junction. The element 48 is contoured to follow the exact periphery of the plate-like structure in its entirety, with an exception to be noted below.

As best seen in FIG. 5, the element 48 is peripherally welded to the structure 36 in such fashion that the surfaces of the central part 38 and wings 40 are tangent to the element 48 at the rear and inner faces thereof, the line of welding being generally indicated by the numeral 50. That is to say, the major portion of the tube is offset toward the front as respects the part 38 and toward the outside as respects each of the wings 40. This minimizes obstructions at the marginal edges of the structure.

Another feature of the invention is that the upper portion of the central part 38 is provided with an opening by means of which an operator at the station 16 may more readily view the logs being pulled in by the cable 30. To this end, then, the upper central part is cut away to provide an opening defined by a lower edge 52 and opposite upright end edges 54. The top edge of the opening is defined by the intermediate straight portion of the element 48 that goes across the top edge of the part 38. The opening thus has generally a rectangular shape, but it is divided into a plurality of smaller openings by a plurality of upright bars 56 welded between the aforesaid portion of the top part of the element 48 and a reinforcing strip 58, preferably welded to the forward surface of the central part 38. The grille structure thus afforded is strong enough to resist the impact of logs while at the same time affording, as aforesaid, a means for the vehicle operator to see what he is doing.

The bumper is simply and inexpensively constructed and its shape affords protection for the rear of the vehicle as well as for the peripheral rear portions of the vehicle rear tires. At this point, it should be observed that the expressions "front" etc. are used for purposes of clarity and not by way of limitations. Likewise, it is known to utilize fairleads or so-called logging arches on dollies and the like separate from a vehicle, in which cases a similar log bumper would find application.

Features and advantages other than those enumerated will readily occur to those versed in the art, as will many modifications and alterations in the preferred embodiment disclosed, all of which may be achieved without departure from the spirit and scope of the invention.

What is claimed is:

1. For a vehicle having a longitudinal body including an end portion carried on and between a pair of similar coaxially spaced apart wheels of such diameter that peripheral portions of the wheels extend longitudinally beyond said portion, log handling means including a log bumper in the form of a U-shaped structure having a transverse, plate-like generally upright central part adapted for disposition closely adjacent to and secured to said body end portion and including transverse upper and lower edges, said structure further having a pair of wings joined to and extending generally longitudinally respectively from opposite end portions of said central part respectively alongside the inner faces of the wheels at the peripheral portions thereof that extend beyond said body end portions, the junction of each wing with the central part being curved about an appreciable radius, each wing having upper and lower edges that are respectively continuations of the upper and lower edges of said central part, the edges of each wing converging in the direction away from the central part to give each wing a generally triangular shape, and a bordering element rigidly secured to said structure about the periphery thereof as defined by said edges and affording the outermost margin of said structure, said element being of rounded section having a cross-sectional dimension greater than the thickness of said wings and central part.

2. For a vehicle having a longitudinal body including an end portion carried on and between a pair of similar coaxially spaced apart wheels of such diameter that peripheral portions of the wheels extend longitudinally beyond said portion, log handling means including a log bumper in the form of a U-shaped structure having a transverse, plate-like generally upright central part adapted for disposition closely adjacent to and secured to said body end portion and including transverse upper and lower edges, said structure further having a pair of wings joined to and extending generally longitudinally respectively from opposite end portions of said central part respectively alongside the inner faces of the wheels at the peripheral portions thereof that extend beyond said body end portions, the junction of each wing with the central part being curved about an appreciable radius, each wing having upper and lower edges that are respectively continuations of the upper and lower edges of said central part, and a bordering element rigidly secured to said structure about the periphery thereof as defined by said edges and affording the outermost margin of said structure, said element being of rounded section having a cross-sectional dimension greater than the thickness of said wings and central part.

3. The invention defined in claim 2, in which: said bordering element is so mounted as to lie flush with the surface of the central part at the side from which the wings extend and respectively flush with the surfaces of the wings that face each other.

References Cited by the Examiner
UNITED STATES PATENTS

| | | | |
|---|---|---|---|
| 1,473,956 | 11/1923 | Eyre et al. | 293—62 X |
| 1,692,342 | 11/1928 | Miller | 293—60 X |
| 1,909,689 | 5/1933 | Kuchar | 214—523 |
| 2,247,664 | 7/1941 | Osman | 280—481 |
| 2,518,322 | 8/1950 | Hovey-King et al. | 254—139.1 |
| 2,529,998 | 11/1950 | Burke | 293—62 XR |
| 2,553,320 | 5/1951 | Huff | 293—95 |
| 2,572,477 | 10/1951 | Harden | 280—60 |
| 2,805,887 | 9/1957 | Selby | 296—102 |
| 2,827,715 | 3/1958 | Wagner | 37—117.5 |
| 2,906,359 | 9/1959 | Wagner et al. | 293—97 X |
| 2,919,142 | 12/1959 | Winget | 280—481 |
| 3,049,186 | 8/1962 | Garrett | 254—139.1 X |
| 3,068,039 | 12/1962 | Barenyi | 293—86 X |

ARTHUR L. LA POINT, *Primary Examiner.*

H. BELTRAN, *Assistant Examiner.*